United States Patent
Chavez et al.

(10) Patent No.: US 7,508,887 B1
(45) Date of Patent: Mar. 24, 2009

(54) SIGNAL ACQUISITION WITH TRANSMIT BLANKING COMPENSATION

(75) Inventors: Carlos J. Chavez, Marion, IA (US);
Kent D. Benson, Marion, IA (US);
Robert K. Fahler, Cedar Rapids, IA (US); Robert J. Frank, Cedar Rapids, IA (US); Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 620 days.

(21) Appl. No.: 11/220,236

(22) Filed: Sep. 6, 2005

(51) Int. Cl.
*H03K 9/00* (2006.01)
*H04L 27/00* (2006.01)
*H04L 5/16* (2006.01)
*H04B 1/38* (2006.01)
*H04B 7/00* (2006.01)

(52) U.S. Cl. .................. 375/316; 370/310; 375/219

(58) Field of Classification Search .......... 375/316, 375/130, 219
See application file for complete search history.

(56) References Cited

U.S. PATENT DOCUMENTS

| | | | |
|---|---|---|---|
| 4,383,323 A | 5/1983 | Timor | |
| 4,688,251 A | 8/1987 | Citron et al. | |
| 5,422,952 A | 6/1995 | Kennedy et al. | |
| 5,625,641 A | 4/1997 | Takakusaki | |
| 5,715,236 A | 2/1998 | Gilhousen et al. | |
| 5,757,767 A | 5/1998 | Zehavi | |
| 5,781,582 A | 7/1998 | Sage et al. | |
| 5,801,651 A * | 9/1998 | Nehoda | 341/70 |
| 5,832,026 A | 11/1998 | Li | |
| 5,898,684 A * | 4/1999 | Currivan et al. | 370/350 |
| 5,914,933 A | 6/1999 | Cimini et al. | |
| 5,930,244 A | 7/1999 | Ariyoshi et al. | |
| 5,943,361 A | 8/1999 | Gilhousen et al. | |
| 6,049,535 A | 4/2000 | Ozukturk et al. | |
| 6,088,337 A | 7/2000 | Eastmond et al. | |
| 6,169,761 B1 | 1/2001 | Marcoccia et al. | |
| 6,246,698 B1 | 6/2001 | Kumar | |
| 6,320,896 B1 | 11/2001 | Jovanovich et al. | |

(Continued)

OTHER PUBLICATIONS

Patent Application for "Statistical Priority-Based Multiple Access System and Method" by Stephen M. Clark, Kelli A. Hoback, and Scott J. F. Zogg, U.S. Appl. No. 10/210,648 filed on Jul. 31, 2002.

(Continued)

*Primary Examiner*—David C Payne
*Assistant Examiner*—Brian J Stevens

(57) ABSTRACT

A method and apparatus for signal acquisition with transmit blanking compensation compensates for collisions between a desired received signal and a transmitted signal. A blanking block blanks a received signal when the transmitted signal is transmitted and stops blanking when the transmitted signal stops to provide a received signal with blanking. A correlation block correlates the received signal with blanking with a known sequence of symbols corresponding to the desired received signal and outputs a correlation metric and a number of symbols blanked. Means for adjusting the correlation metric or a variable threshold using the number of symbols blanked are provided. A decision block compares the adjusted correlation metric to a fixed threshold or the correlation metric to the variable threshold. If the adjusted correlation metric exceeds the threshold or if the correlation metric exceeds the variable threshold, the decision block determines that the desired signal is detected.

16 Claims, 4 Drawing Sheets

U.S. PATENT DOCUMENTS

| | | |
|---|---|---|
| 6,498,820 B1 | 12/2002 | Thomson et al. |
| 6,519,262 B1 | 2/2003 | Stephens et al. |
| 6,522,650 B1 | 2/2003 | Yonge et al. |
| 6,658,063 B1 | 12/2003 | Mizoguchi et al. |
| 6,671,331 B1 | 12/2003 | Sakuma |
| 6,686,829 B1 | 2/2004 | Hohberger et al. |
| 6,721,331 B1 | 4/2004 | Agrawal et al. |
| 6,836,469 B1 | 12/2004 | Wu |
| 6,904,282 B2 | 6/2005 | Cooper |
| 6,917,606 B2 | 7/2005 | Sashihara |
| 7,088,734 B2 | 8/2006 | Newberg et al. |
| 7,142,521 B2 | 11/2006 | Haugli et al. |
| 7,292,617 B2 | 11/2007 | Beasley et al. |
| 2002/0009067 A1 | 1/2002 | Sachs et al. |
| 2003/0012217 A1 | 1/2003 | Andersson et al. |
| 2003/0053469 A1 | 3/2003 | Wentink |
| 2004/0203460 A1 | 10/2004 | Hasegawa |
| 2005/0013386 A1 | 1/2005 | Ojard |
| 2005/0030914 A1 | 2/2005 | Binzel et al. |
| 2005/0242990 A1 | 11/2005 | Lawrence et al. |
| 2005/0254560 A1 | 11/2005 | Huang |
| 2006/0018391 A1 | 1/2006 | Cho et al. |

OTHER PUBLICATIONS

Patent Application for "Waveform for Virtually Simultaneous Transmission and Multiple Receptions System and Method" by Scott J. F. Zogg, Stephen M. Clark, Richard S. Haendel, Ronald R. Meyer, and Brian L. Aanderud, U.S. Appl. No. 10/217,731 filed Aug. 13, 2002.

Patent Application for "Relative Navigation for Precision Rendezvous and Station Keeping Using Datalink Signals" by Gary A. McGraw, Robert J. Frank, Kenneth M. Peterson, Richard S. Haendel, and Scott J. F. Zogg, U.S. Appl. No. 10/848,708 filed on May 19, 2004.

Patent Application for "Improved Interference Estimation for Interference Excision with Low Computational Complexity" by Carlos J. Chavez, Robert J. Frank, and Erik M. Sjolander, U.S. Appl. No. 11/098,757 filed on Apr. 4, 2005.

* cited by examiner

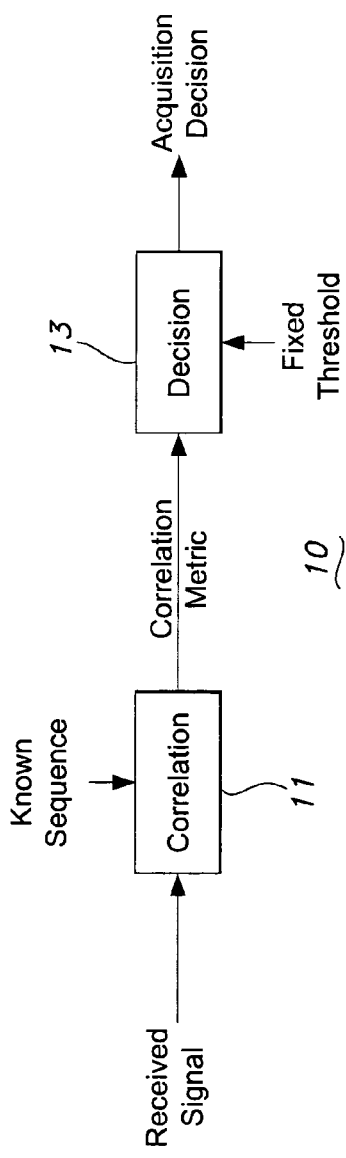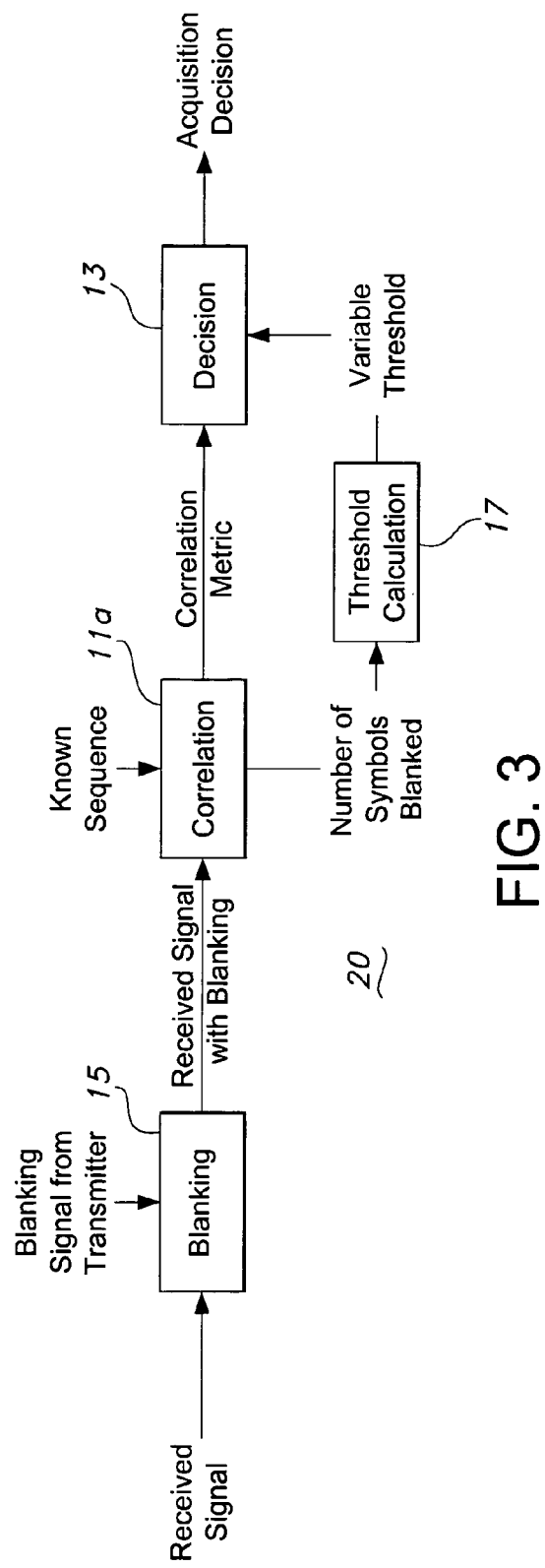
FIG. 1
(Prior Art)
FIG. 3

SIGNAL ACQUISITION WITH TRANSMIT BLANKING COMPENSATION

GOVERNMENT RIGHTS

This invention was made with Government support under Contract No. F33615-01-C-1856 Tactical Targeting Network Technology (TTNT) awarded by USAF/AFMC Air Force Research Laboratory/SNKD, Wright-Patterson AFB, Ohio. The Government may have certain rights in the invention.

CROSS REFERENCE TO RELATED APPLICATIONS

The present application is related to co-pending application Ser. No. 10/210,648 filed on Jul. 31, 2002 entitled "Statistical Priority-Based Multiple Access System and Method" by Stephen M. Clark, Kelli A. Hoback, and Scott J. F. Zogg; to Ser. No. 10/217,731 filed on Aug. 13, 2002 entitled "Waveform for Virtually Simultaneous Transmission and Multiple Receptions System and Method" by Scott J. F. Zogg, Stephen M. Clark, Richard S. Haendel, Ronald R. Meyer, and Brian L. Aanderud; to Ser. No. 10/848,708 filed on May 19, 2004 entitled "Relative Navigation for Precision Rendezvous and Station Keeping Using Datalink Signals" by Gary A. McGraw, Robert J. Frank, Kenneth M. Peterson, Richard S. Haendel, and Scott J. F. Zogg; and to Ser. No. 11/098,757 filed on Apr. 4, 2005 entitled "Improved Interference Estimation for Interference Excision with Low Computational Complexity" by Carlos J. Chavez, Robert J. Frank, and Erik M. Sjolander. The co-pending applications are incorporated by reference herein in their entirety. All applications are assigned to the assignee of the present application.

BACKGROUND OF THE INVENTION

The present invention relates to communications, tactical data links, and specifically for a technique of signal acquisition with transmit blanking compensation in a tactical data link.

TTNT (Tactical Targeting Networking Technology) is an advanced tactical data link currently under development. TTNT is a high-speed, dynamic ad hoc network designed to assist the U.S. military in creating a rapid targeting capability critical across vital military operations. TTNT supports more than 200 users for secure jam-resistant transmission. The TTNT system is capable of simultaneous transmit and receive with no hold-off time and no preplanning. TTNT operates in full-duplex transmit and receive with four-channel simultaneous reception. TTNT network formation is simple, with automatic network organization and key exchanges performed anytime, even enroute. The secure TTNT network coexists with fielded technologies including Link-16 and is interoperable with the Wideband Networking Waveform (WNW) at the baseband network layer. The high-speed TTNT network enables net-centric sensor technologies to correlate data among multiple platforms by precisely geo-locating time-critical targets. Each TTNT user is capable of operation at 2-Mbps transmit and 10-Mbps receive. Communications ranges to 100 miles at 2 Mbps and 300 miles at 250 kbps are provided. A transmit power control algorithm is built in.

TTNT is a fully connected network with a subgroup relay built in. No network pre-planning is required for a mission. Broadcast, multi-cast and point-to-point service are provided to the application. Network security is provided by authentication, message security (MSEC) key distribution, and multiple independent levels of security (MILS). TTNT offers five-second network ingress with quality of service and class of service attributes built in. The TTNT system offers 1.7-ms transaction latency. The number of users is limited by channel capacity and not networking. The TTNT address space allows greater than 65,000 users to be supported.

One of the unique characteristics of the TTNT signal-in-space is the capability of a terminal to receive a message while concurrently transmitting a message in the same frequency band. Successful acquisition of an incoming signal is critical to the implementation of TTNT receive-while-transmit functionality.

What is needed is a method of signal acquisition with transmit blanking compensation for achieving successful acquisition of an incoming signal for TTNT receive-while-transmit functionality.

SUMMARY OF THE INVENTION

An apparatus for signal acquisition with transmit blanking compensation for collisions between a desired received signal and a transmitted signal is disclosed. A blanking block accepts a received signal and a blanking signal and when the transmitted signal is transmitted, the blanking signal is asserted and when the transmitted signal stops, the blanking signal is de-asserted thereby providing a received signal with blanking. A correlation block correlates the received signal with blanking from the blanking block with a known sequence of symbols corresponding to the desired received signal. The correlation block outputs a correlation metric and outputs a number of symbols blanked for each correlation metric computed. Means are provided for adjusting the correlation metric or a variable threshold by using the number of symbols blanked. A decision block compares the adjusted correlation metric to a fixed threshold or the correlation metric to the variable threshold. If the adjusted correlation metric exceeds the threshold or if the correlation metric exceeds the variable threshold, the decision block determines that the desired signal is detected.

The means for adjusting the variable threshold comprises a threshold calculation block for calculating the variable threshold determined by the number of symbols blanked from the correlation block. The calculation occurs once for every correlation metric produced by the correlation block.

The means for adjusting the correlation metric comprises a gain calculation block that computes a variable gain determined by the number of symbols blanked from the correlation block. The calculation occurs once for every correlation metric produced by the correlation block. A multiplier uses the variable gain to adjust the correlation metric.

It is an object of the present invention to provide successful acquisition of an incoming signal for the implementation of TTNT receive-while-transmit functionality.

It is an object of the present invention to compensate for collisions between a received signal and a transmit signal.

It is an advantage of the present invention to provide signal acquisition with transmit blanking compensation.

It is an advantage of the present invention to vary a threshold with a number of symbols blanked when a desired signal presence decision is made.

It is a feature of the present invention to provide an alternate embodiment that varies a correlation metric in accordance with a number of symbols blanked.

BRIEF DESCRIPTION OF THE DRAWINGS

The invention may be more fully understood by reading the following description of the preferred embodiments of the invention in conjunction with the appended drawings wherein:

FIG. 1 depicts a typical system known in the art for signal acquisition using a correlation block and a decision block with a threshold;

FIG. 3 depicts a technique of signal acquisition with transmit blanking compensation of the present invention;

DETAILED DESCRIPTION

The present invention is for a method and apparatus for signal acquisition with transmit blanking compensation for use in a radio communications system where a radio terminal receives a message while concurrently transmitting a message in the same frequency band. The present invention is applicable to such communications systems as the TTNT data link.

The present invention is also applicable to collocated communications systems. A receiver incorporating the present invention for signal acquisition with transmit blanking compensation may acquire a desired signal while a cosite transmitter is transmitting by compensating for collisions between the desired received signal and a transmitted signal. The present invention is also applicable to a receiver in a communications system subject to very strong interferers or jammers by compensating for collisions between the desired received signal and a strong interfering or jamming signal.

FIG. 1 depicts a typical system 10 known in the art for signal acquisition using a correlation block 11 and a decision block 13 with a fixed threshold. The correlation block 11 attempts to correlate an incoming received signal with a known sequence of symbols corresponding to a desired signal. The correlation block 11 produces a correlation metric, which measures how well the incoming signal matches the known sequence. The decision block 13 compares the correlation metric to the fixed threshold. If the correlation metric exceeds the threshold, the decision block 13 determines that a desired signal has been detected. The fixed threshold is typically determined in a compromise between false alarm probability and probability of successful detection of a desired signal.

The TTNT signal-in-space has a unique characteristic of allowing a terminal to receive a message while concurrently transmitting a message in the same frequency band. This is made possible by the structure of the TTNT signal-in-space. A TTNT message consists of a number of pulses (or dwells), each transmitted on a pseudo-randomly selected frequency with pseudo-random time gaps between pulses. In general, any two TTNT messages have different pseudo-random frequency hopping patterns and different pseudo-random time gaps between pulses.

Figure 2:
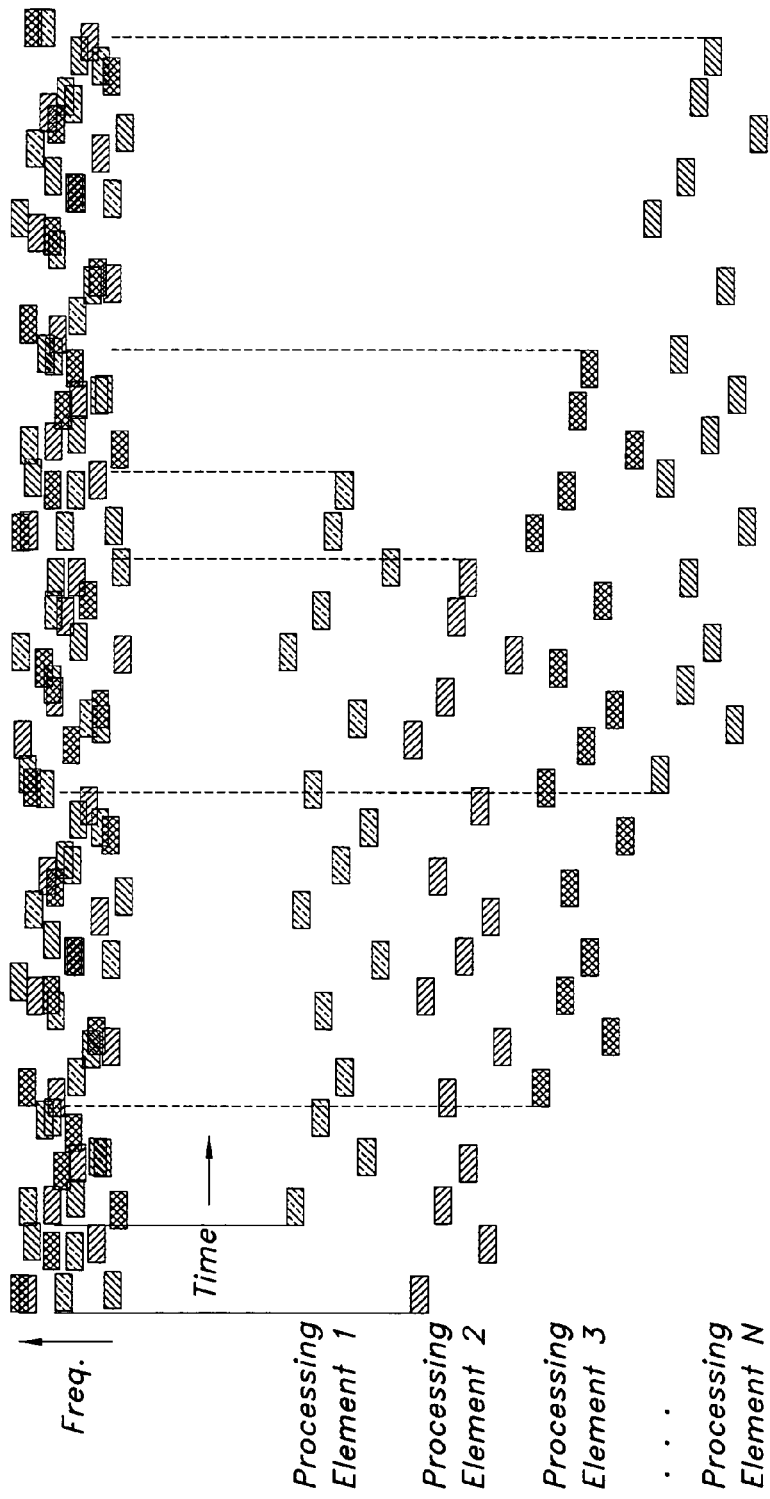
FIG. 2 shows the TTNT waveform with multiple streams arriving with unique frequency hopping patterns at different times at a node in a datalink.

Co-pending application Ser. No. 10/217,731 entitled "Waveform for Virtually Simultaneous Transmission and Multiple Receptions System and Method" by Scott J. Zogg, Stephen M. Clark, Richard S. Haendel, Ronald R. Meyer, and Brian L. Aanderud, incorporated by reference herein, describes the TTNT waveform. FIG. 2 shows multi-stream correlation and reception in the TTNT datalink. Multiple streams arrive with unique frequency hopping patterns at different times at a node in the datalink as shown at the top of FIG. 2. The bottom of FIG. 2 shows what packets are destined for different processing elements from the multiple streams from different sources. For example processing element 1 receives the cross hatched packets at differing frequencies and arrival times than other processing elements thereby enabling receiving of multiple packet streams at a receiver capable of processing such multiple streams.

When a TTNT terminal is transmitting a message and attempts to receive another message, some of the received signal collides with the transmitted signal. In general, transmitted power is high enough that the entire frequency band is desensitized during a transmitted pulse. This means that a transmitted pulse does not have to be on the same frequency as a received pulse in order to collide with it. However, because of the pseudo-random time gaps between pulses, some of the received signal does not collide with the transmitted signal and can be successfully received. Because of the forward error correction coding included in a TTNT message, it is possible for a TTNT terminal to recover a message received while concurrently transmitting.

To recover such a message, a TTNT terminal must first acquire the signal. The typical system 10 of signal acquisition presented in FIG. 1 is not sufficient for acquiring a signal while transmitting. This is because the system 10 does not compensate for collisions between a received signal and a transmitted signal. The system 10 has no means of knowing when collisions occur and no blanking function to blank signal collisions. The correlation block 11 attempts to correlate the incoming received signal with the known sequence of symbols corresponding to the desired signal. The correlation block 11 operates in a manner such that if portions of the received signal are blanked they do not contribute to the correlation metric thereby reducing the correlation metric. If no means for compensating for the reduction in correlation metric are provided such as adjusting the threshold or varying the correlation metric, signal acquisition may not be possible.

A solution to this problem is a method and apparatus for signal acquisition with transmit blanking compensation of the present invention. FIG. 3 depicts a technique of signal acquisition with transmit blanking compensation 20 of the present invention. This technique is an enhancement of the typical system 10 for signal acquisition shown in FIG. 1. The signal acquisition with transmit blanking compensation 20 compensates for collisions between a desired received signal and a transmitted signal. Signal acquisition with transmit blanking compensation is achieved by adjusting a variable threshold or varying a correlation metric gain based on the amount of collision that occurs.

In FIG. 3, a blanking block 15 accepts the received signal, as well as a blanking signal from a transmitter (not shown) within the terminal. When a signal is being transmitted, the blanking signal is asserted. When the transmission stops, the blanking signal is de-asserted. For a TTNT terminal, the blanking signal is asserted during transmitted pulses, but de-asserted during the time gaps between pulses. The blanking signal may come from a cosite transmitter (not shown) in a collocated communications system and is generated when the cosite transmitter is transmitting. The blanking signal may be generated by a very strong interfering signal or a jamming signal with a receiver (not shown) that receives the interfering signal and provides the blanking signal when the interfering signal is present.

When the blanking signal is asserted, the blanking block 15 alters the received signal to indicate this. This is referred to as blanking the received signal. One means of blanking is to set a value of the received signal to a number such as zero, +1, −1, or some other value to indicate when the blanking signal is asserted. Other methods are possible, such as outputting the blanking signal along with the received signal.

A correlation block 11a of the present invention in FIG. 3 outputs a number of symbols blanked for each correlation metric computed. At any given time, this is the number of blanked received symbols that correspond in time to the known sequence against which the received signal is correlated. In the present invention by using the number of symbols blanked for each correlation metric computed, portions of the received signal that are blanked and do not contribute to the correlation metric can be compensated for by varying a threshold or varying a gain to adjust the correlation metric.

A threshold calculation block 17 outputs a variable threshold determined by the number of symbols blanked. The calculation in the calculation block 17 occurs once for every metric produced by the correlation block 11a. When symbols are blanked as described, the effect is the same as having a shorter sequence of known symbols, and thus a shorter correlator. A shorter correlator produces lower correlation metrics when a desired signal is present. A shorter correlator also produces lower correlation metrics with no signal present. To compensate for this, the variable threshold can be decreased as more symbols are blanked. Any number of algorithms can be employed to compute the variable threshold. The particular choice of algorithm is based on a compromise between false alarm probability and probability of successful detection of a desired signal. Finally, the decision block 13 compares the correlation metric to the variable threshold. If the correlation metric exceeds the threshold, the decision block 13 determines that the desired signal has been detected.

Figure 4:
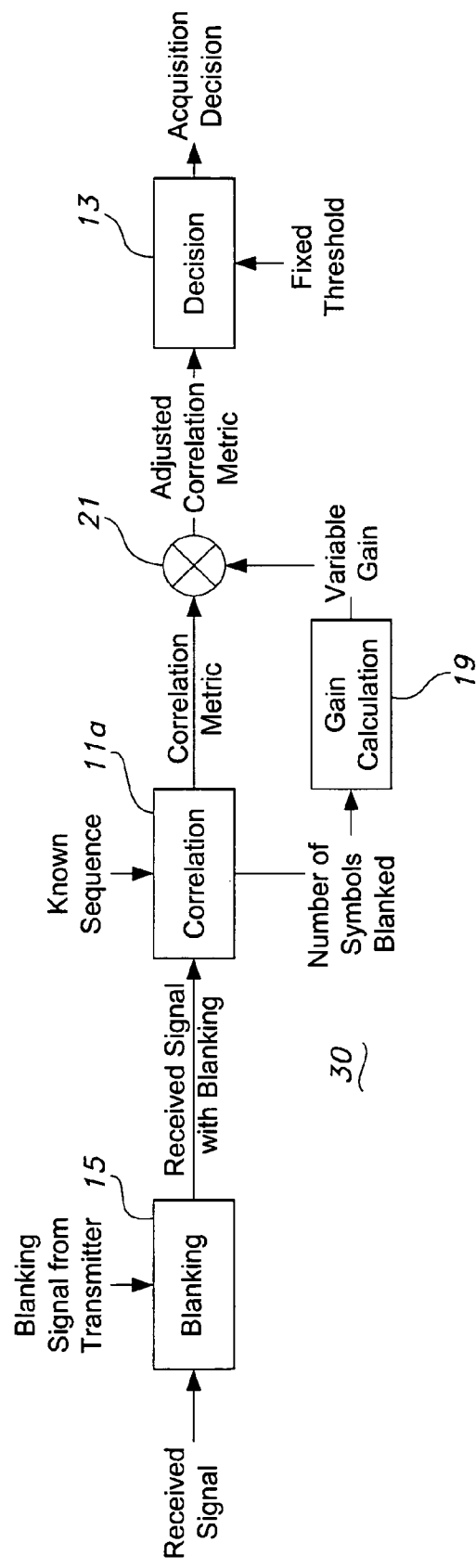
FIG. 4 shows an alternate embodiment for signal acquisition with transmit blanking compensation of the present invention.

FIG. 4 shows an alternate embodiment 30 for signal acquisition with transmit blanking compensation of the present invention. Instead of calculating a variable threshold, a gain calculation block 19 computes a variable gain. The variable gain is used to adjust the correlation metric with multiplier 21. The adjusted correlation metric is then compared to a fixed threshold in the decision block 13. This alternate embodiment is mathematically equivalent to that depicted in FIG. 3, but may be preferable in some applications.

Figure 5:
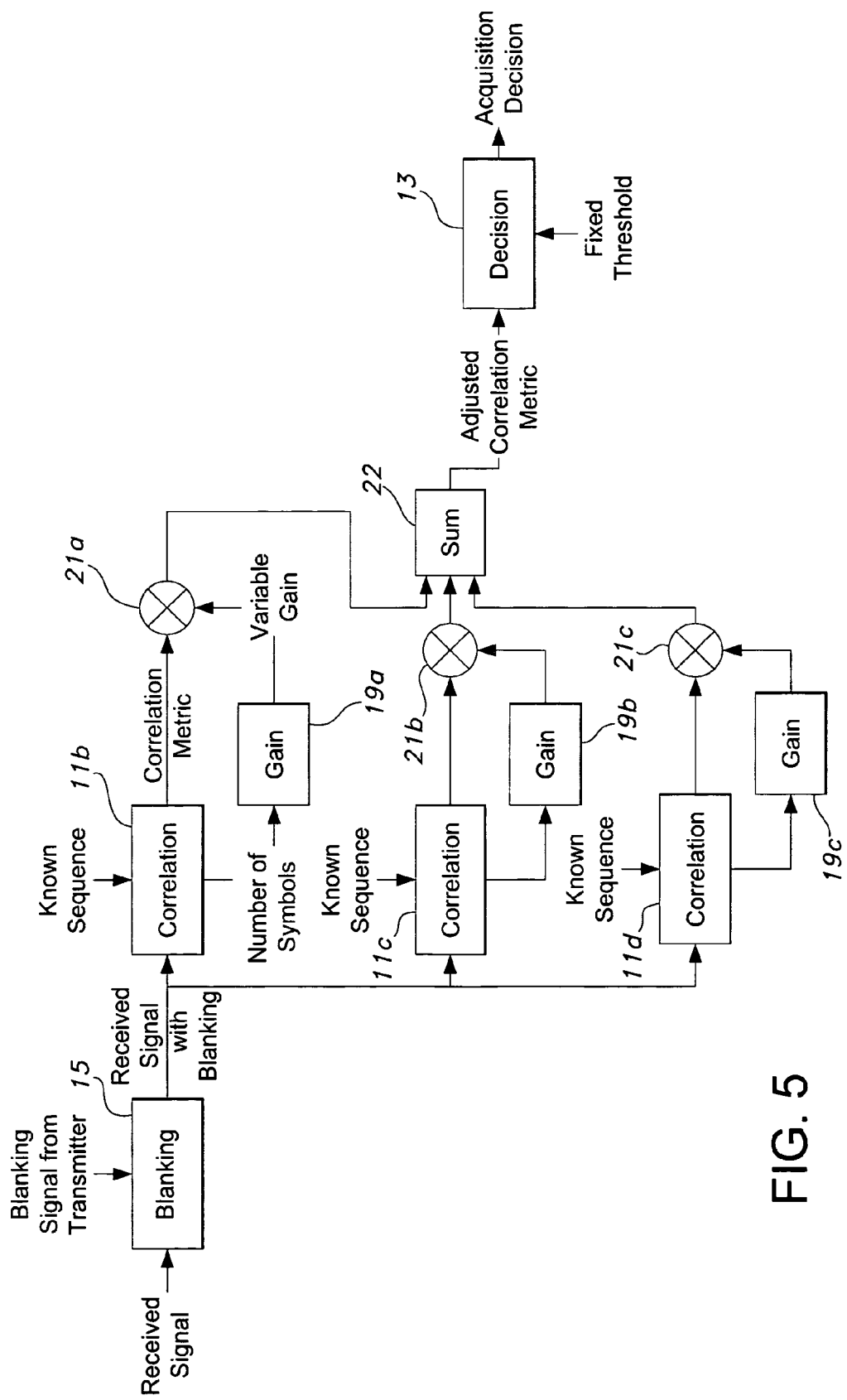
FIG. 5 illustrates blanking compensation on subsets of a correlation that may be employed in the present invention.

In some situations, it may be desirable to employ transmit blanking compensation on subsets of the correlation block 11a as shown in FIG. 5. In this instance, the correlation block 11a in FIG. 4 is decomposed into multiple sub-correlators, 11b, 11c, 11d, and may include others not shown, that ultimately sum in block 22 together to form the final adjusted correlation metric. Each sub-correlator has a gain calculation block 19a, 19b, and 19c that produce a variable gain for that sub-correlation that adjusts a sub-correlation metric in multipliers 21a, 21b, and 21c for each of the sub-correlators 11b, 11c, and 11c. Thus, each sub-correlation is independently adjusted prior to the final correlation sum block 22 and subsequent comparison to a fixed threshold in decision block 13.

One of the unique characteristics of the TTNT signal-in-space is the capability of a terminal to receive a message while concurrently transmitting a message in the same frequency band. Successful acquisition of an incoming signal is critical to the implementation of TTNT receive-while-transmit functionality. The present invention for signal acquisition with transmit blanking compensation enables receive-while-transmit acquisition of an incoming signal by compensating for collisions between a received signal and a transmitted signal.

It is believed that the signal acquisition with transmit blanking compensation technique of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus for signal acquisition with transmit blanking compensation for collisions between a desired received signal and a transmitted signal comprising:

a blanking block for accepting a received signal and a blanking signal wherein when the transmitted signal is transmitted, the blanking signal is asserted and when the transmitted signal stops, the blanking signal is de-asserted thereby providing a received signal with blanking;

a correlation block for correlating the received signal with blanking from the blanking block with a known sequence of symbols corresponding to the desired received signal wherein the correlation block outputs a correlation metric and outputs a number of symbols blanked for each correlation metric computed;

means for adjusting one of the correlation metric and a variable threshold, against which the correlation metric is compared, using the number of symbols blanked; and a decision block for comparing the adjusted correlation metric to a fixed threshold or the correlation metric to the variable threshold wherein if the adjusted correlation metric exceeds the threshold or if the correlation metric exceeds the variable threshold, the decision block determines that the desired signal is detected.

2. The apparatus for signal acquisition with transmit blanking compensation for collisions between a desired received signal and a transmitted signal of claim 1 wherein the received signal with blanking is set to a value that indicates when the blanking signal is asserted.

3. The apparatus for signal acquisition with transmit blanking compensation for collisions between a desired received signal and a transmitted signal of claim 1 wherein the blanking signal is asserted during transmitted pulses and de-asserted during time gaps between pulses.

4. An apparatus for signal acquisition with transmit blanking compensation for collisions between a desired received signal and a transmitted signal comprising:

a blanking block for accepting a received signal and a blanking signal wherein when the transmitted signal is transmitted, the blanking signal is asserted and when the transmitted signal stops, the blanking signal is de-asserted, thereby providing a received signal with blanking;

a correlation block for correlating the received signal with blanking from the blanking block with a known sequence of symbols corresponding to the desired received signal wherein the correlation block outputs a correlation metric and outputs a number of symbols blanked for each correlation metric computed;

means for adjusting one of the correlation metric and a variable threshold using the number of symbols blanked;

a decision block for comparing the adjusted correlation metric to a fixed threshold or the correlation metric to the variable threshold wherein if the adjusted correlation metric exceeds the threshold or if the correlation metric exceeds the variable threshold, the decision block determines that the desired signal is detected; and wherein the means for adjusting the variable threshold comprises a threshold calculation block for calculating the variable threshold determined by the number of symbols blanked from the correlation block wherein the calculation occurs once for every correlation metric produced by the correlation block.

5. An apparatus for signal acquisition with transmit blanking compensation for collisions between a desired received signal and a transmitted signal comprising:

a blanking block for accepting a received signal and a blanking signal wherein when the transmitted signal is transmitted, the blanking signal is asserted and when the transmitted signal stops the blanking signal is de-asserted, thereby providing a received signal with blanking;

a correlation block for correlating the received signal with blanking from the blanking block with a known sequence of symbols corresponding to the desired received signal wherein the correlation block outputs a correlation metric and outputs a number of symbols blanked for each correlation metric computed;

means for adjusting one of the correlation metric and a variable threshold using the number of symbols blanked;

a decision block for comparing the adjusted correlation metric to a fixed threshold or the correlation metric to the variable threshold wherein if the adjusted correlation metric exceeds the threshold or if the correlation metric exceeds the variable threshold, the decision block determines that the desired signal is detected; and wherein the means for adjusting the correlation metric comprises:

a gain calculation block for computing a variable gain determined by the number of symbols blanked from the correlation block wherein the calculation occurs once for every correlation metric produced by the correlation block; and a multiplier that uses the variable gain to adjust the correlation metric.

6. An apparatus for signal acquisition with transmit blanking compensation for collisions between a desired received signal and a transmitted signal comprising:

a blanking block for accepting a received signal and a blanking signal wherein when the transmitted signal is transmitted, the blanking signal is asserted and when the transmitted signal stops, the blanking signal is deasserted, thereby providing a received signal with blanking;

a correlation block for correlating the received signal with blanking from the blanking block with a known sequence of symbols corresponding to the desired received signal wherein the correlation block outputs a correlation metric and outputs a number of symbols blanked for each correlation metric computed;

means for adjusting one of the correlation metric and a variable threshold using the number of symbols blanked;

a decision block for comparing the adjusted correlation metric to a fixed threshold or the correlation metric to the variable threshold wherein if the adjusted correlation metric exceeds the threshold or if the correlation metric exceeds the variable threshold, the decision block determines that the desired signal is detected;

wherein the correlation block comprises a plurality of sub-correlators and said apparatus further comprises:

a plurality of gain calculation blocks for computing a variable gain from a number of symbols blanked output from each of the plurality of sub-correlators;

a plurality of multipliers that use the variable gain to adjust a sub-correlation metric from each of the plurality of sub-correlators; and a summing block for summing the adjusted sub-correlation metric from each of the plurality of sub-correlators to produce the adjusted correlation metric.

7. A method of signal acquisition with transmit blanking compensation for collisions between a desired received signal and a transmitted signal comprising the steps of:

asserting a blanking signal in a blanking block when the transmitted signal is transmitted to blank a received signal;

de-asserting the blanking signal when the transmitted signal stops to provide a received signal with blanking;

correlating the received signal with blanking from the blanking block with a known sequence of symbols corresponding to the desired received signal in a correlation block;

outputting a correlation metric and a number of symbols blanked for each correlation metric computed from the correlation block;

adjusting one of the correlation metric and a variable threshold by using the number of symbols blanked;

comparing in a decision block the adjusted correlation metric to a fixed threshold or the correlation metric to the variable threshold;

determining in the decision block that the desired signal is detected if the adjusted correlation metric exceeds the threshold or if the correlation metric exceeds the variable threshold;

further comprising the step of calculating in a threshold calculation block the variable threshold determined by the number of symbols blanked once for every correlation metric produced by the correlation block.

8. A method of signal acquisition with transmit blanking compensation for collisions between a desired received signal and a transmitted signal comprising the steps of:

asserting a blanking signal in a blanking block when the transmitted signal is transmitted to blank a received signal;

de-asserting the blanking signal when the transmitted signal stops to provide a received signal with blanking;

correlating the received signal with blanking from the blanking block with a known sequence of symbols corresponding to the desired received signal in a correlation block;

outputting a correlation metric and a number of symbols blanked for each correlation metric computed from the correlation block;

adjusting one of the correlation metric and a variable threshold, against which the correlation metric is compared, by using the number of symbols blanked;

comparing in a decision block the adjusted correlation metric to a fixed threshold or the correlation metric to the variable threshold; and determining in the decision block that the desired signal is detected if the adjusted correlation metric exceeds the threshold or if the correlation metric exceeds the variable threshold.

9. The method of signal acquisition with transmit blanking compensation for collisions between a desired received signal and a transmitted signal of claim 8 further comprising the step of setting the received signal with blanking to a value to indicate that the blanking signal is asserted.

10. The method of signal acquisition with transmit blanking compensation for collisions between a desired received signal and a transmitted signal of claim 8 further comprising the steps of:
asserting the blanking signal during transmitted pulses; and
de-asserting the blanking signal during time gaps between pulses.

11. A method of signal acquisition with transmit blanking compensation for collisions between a desired received signal and a transmitted signal comprising the steps of:
asserting a blanking signal in a blanking block when the transmitted signal is transmitted to blank a received signal;
de-asserting the blanking signal when the transmitted signal stops to provide a received signal with blanking;
correlating the received signal with blanking from the blanking block with a known sequence of symbols corresponding to the desired received signal in a correlation block;
outputting a correlation metric and a number of symbols blanked for each correlation metric computed from the correlation block;
adjusting one of the correlation metric and a variable threshold by using the number of symbols blanked;
comparing in a decision block the adjusted correlation metric to a fixed threshold or the correlation metric to the variable threshold;
determining in the decision block that the desired signal is detected if the adjusted correlation metric exceeds the threshold or if the correlation metric exceeds the variable threshold;
further comprising the steps of:
computing in a gain calculation block a variable gain determined by the number of symbols blanked once for every correlation metric produced by the correlation block; and
adjusting the correlation metric with a multiplier using the variable gain.

12. A method of signal acquisition with transmit blanking compensation for collisions between a desired received signal and a transmitted signal comprising the steps of:
asserting a blanking signal in a blanking block when the transmitted signal is transmitted to blank a received signal;
de-asserting the blanking signal when the transmitted signal stops to provide a received signal with blanking;
correlating the received signal with blanking from the blanking block with a known sequence of symbols corresponding to the desired received signal in a correlation block;
outputting a correlation metric and a number of symbols blanked for each correlation metric computed from the correlation block;
adjusting one of the correlation metric and a variable threshold by using the number of symbols blanked;
comparing in a decision block the adjusted correlation metric to a fixed threshold or the correlation metric to the variable threshold;
determining in the decision block that the desired signal is detected if the adjusted correlation metric exceeds the threshold or if the correlation metric exceeds the variable threshold;
further comprises the steps of:
correlating the received signal with blanking with the known sequence in a plurality of sub-correlators to provide a plurality of sub-correlation metrics;
providing a plurality of a number of symbols blanked from the plurality of sub-correlators;
computing a plurality of variable gains determined by plurality of the number of symbols blanked;
adjusting the plurality of sub-correlation metrics using the plurality of variable gains; and
summing the plurality of adjusted sub-correlation metrics to provide the adjusted correlation metric.

13. A method of signal acquisition with transmit blanking compensation of a desired received signal comprising the steps of:
blanking a received signal, through the use of a blanking block, with a blanking signal when a transmitted signal is present, to provide a received signal with blanking;
un-blanking the received signal with blanking signal when the transmitted signal is not present;
correlating the received signal, through the use of a correlation block, with blanking with a known sequence to provide a correlation metric wherein the correlation metric is reduced by portions of the received signal that are blanked;
compensating for the reduction in correlation metric;
deciding if the desired signal is present based on the compensation for the reduction in correlation metric;
wherein the step of compensating for the reduction in correlation metric further comprises the steps of:
providing a number of symbols blanked;
calculating a variable threshold determined by the number of symbols blanked;
comparing the reduced correlation metric to the variable threshold; and
deciding if the desired signal is present based on the comparison of the reduced correlation metric and the variable threshold.

14. The method of signal acquisition with transmit blanking compensation of a desired received signal of claim 13 further comprising the step of setting the received signal with blanking to a value to indicate the blanking signal is asserted.

15. The method of signal acquisition with transmit blanking compensation of a desired received signal of claim 13 further comprising the steps of:
asserting the blanking signal during transmitted pulses; and
de-asserting the blanking signal during time gaps between pulses.

16. A method of signal acquisition with transmit blanking compensation of a desired received signal comprising the steps of:
blanking a received signal, the use of a blanking block, with a blanking signal when a transmitted signal is present, to provide a received signal with blanking;
un-blanking the received signal with blanking when the transmitted signal is not present;
correlating the received signal, through the use of a correlation block, with blanking with a known sequence to provide a correlation metric wherein the correlation metric is reduced by portions of the received signal that are blanked;

compensating for the reduction in correlation metric; and
deciding if the desired signal is present based on the compensation for the reduction in correlation metric;
wherein the step of compensating for the reduction in correlation metric further comprises the steps of:
providing a number of symbols blanked;
computing a variable gain determined by the number of symbols blanked;

adjusting the reduced correlation metric using the variable gain;
comparing the adjusted reduced correlation metric to a threshold; and
deciding if the desired signal is present based on the comparison of the adjusted reduced correlation metric and the threshold.

\* \* \* \* \*